June 27, 1950 D. V. EDWARDS ET AL 2,512,617

ELECTRON DISCHARGE DEVICE

Filed Feb. 4, 1947 5 Sheets-Sheet 1

INVENTORS
D.V. EDWARDS and
BY D.C. WINTERS
Neil W. Preston,
Their ATTORNEY

ELECTRON DISCHARGE DEVICE

Filed Feb. 4, 1947 5 Sheets-Sheet 2

INVENTORS
D.V. EDWARDS and
BY D.C. WINTERS
Neil W. Preston,
Their ATTORNEY

ELECTRON DISCHARGE DEVICE

Filed Feb. 4, 1947 5 Sheets-Sheet 3

INVENTORS.
D.V. EDWARDS and
D.C. WINTERS
BY Neil L. Preston,
Their ATTORNEY

ELECTRON DISCHARGE DEVICE

Filed Feb. 4, 1947

INVENTORS
D.V. EDWARDS and
BY D.C. WINTERS
Neil W. Preston,
Their ATTORNEY

FIG. 15.
FIG. 14A.
FIG. 14B.
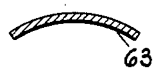
FIG. 14C.
FIG. 14D.
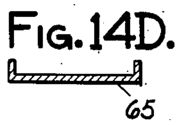
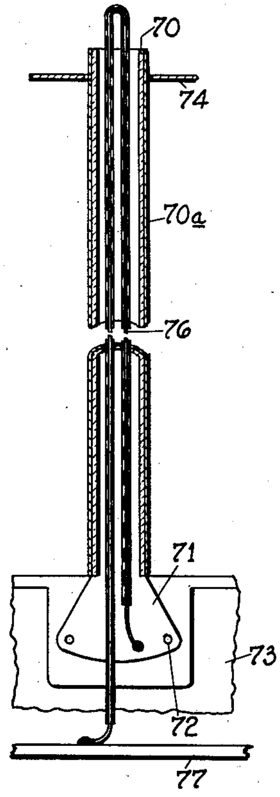
FIG. 16.
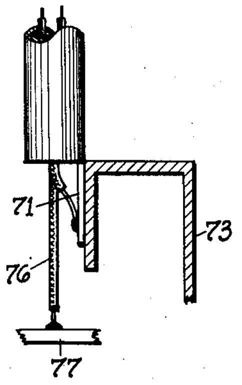
INVENTORS
D.V. EDWARDS and
D.C. WINTERS
BY Neil W. Preston,
Their ATTORNEY Patented June 27, 1950

2,512,617

UNITED STATES PATENT OFFICE 2,512,617

ELECTRON DISCHARGE DEVICE

Donald V. Edwards, Montclair, and Donald C. Winters, Newark, N. J., assignors to Electrons, Incorporated, Newark, N. J., a corporation of Delaware Application February 4, 1947, Serial No. 726,382

23 Claims. (Cl. 250—27.5)

This invention relates to electron discharge devices, and more particularly to electron discharge tubes controlled by a control electrode or grid and capable of providing large currents for power oscillators, inverters and the like.

In one type of controllable electron discharge tubes, such as disclosed and claimed in the prior application of James H. Burnett, Ser. No. 647,007, filed February 12, 1946, which may be termed a magnatriode, a strong magnetic field cooperates with an organization of an anode, cathode and control electrode of a tube in such a way that there is no appreciable electron current to the control electrode or grid, even when it assumes a relatively high positive potential with respect to the cathode. This characteristic of such a magnatriode is of material advantage in various applications where conventional triodes are employed, such as power oscillators, for example. Among other things, such a magnatriode is capable of providing relatively large anode currents for low anode voltages by utilizing a strong magnetic field and high positive potentials on the control grid, thereby decreasing the losses in the tube and improving its plate efficiency.

The primary object of this invention is to provide a structural organization and arrangement of parts for an electron discharge device of this magnatriode type which will afford the desired area and relationship of the anode, cathode and control element for large currents within dimensions suitable for use in the small airgap of an efficient means, such as a permanent magnet, for creating a strong magnetic field.

Further objects of the invention are to obtain this objective by a simple and effective organization and disposition of parts, together with structural expedients for supporting and insulating the tube elements in such a manner as to occupy a small space, and yet maintain the proper relationship between the elements in spite of changes in temperature and the action of the magnetic field.

Various other objects, attributes, and characteristic features of the invention will be in part apparent, and in part pointed out hereinafter.

Generally speaking, and without attempting to define the nature and scope of the invention, it is proposed to provide a multi-cellular organization of an elemental arrangement of a cathode, anode and grid, in which the desired area and extent of these elements is obtained within small dimensions suitable for the airgap of an efficient permanent magnet or equivalent, and in which the cathode and grid elements of such a multi-cellular structure are insulated and supported in the desired fixed space relation, and also structurally formed to provide the necessary stiffness or rigidity against displacement by temperature changes and the influence of the magnetic field, as well as allow for adequate expansion of the parts when heated in operation of the tube.

The accompanying drawings illustrate certain embodiments of the structural organization, physical arrangement and interconnection of parts characterizing the invention, certain parts being illustrated in a schematic or diagrammatic manner, and more with a view of facilitating an explanation and understanding of the nature of the invention, than for the purpose of illustrating in detail the particular constructions that may be advantageously employed in practice.

In the accompanying drawings.

Figure 4:
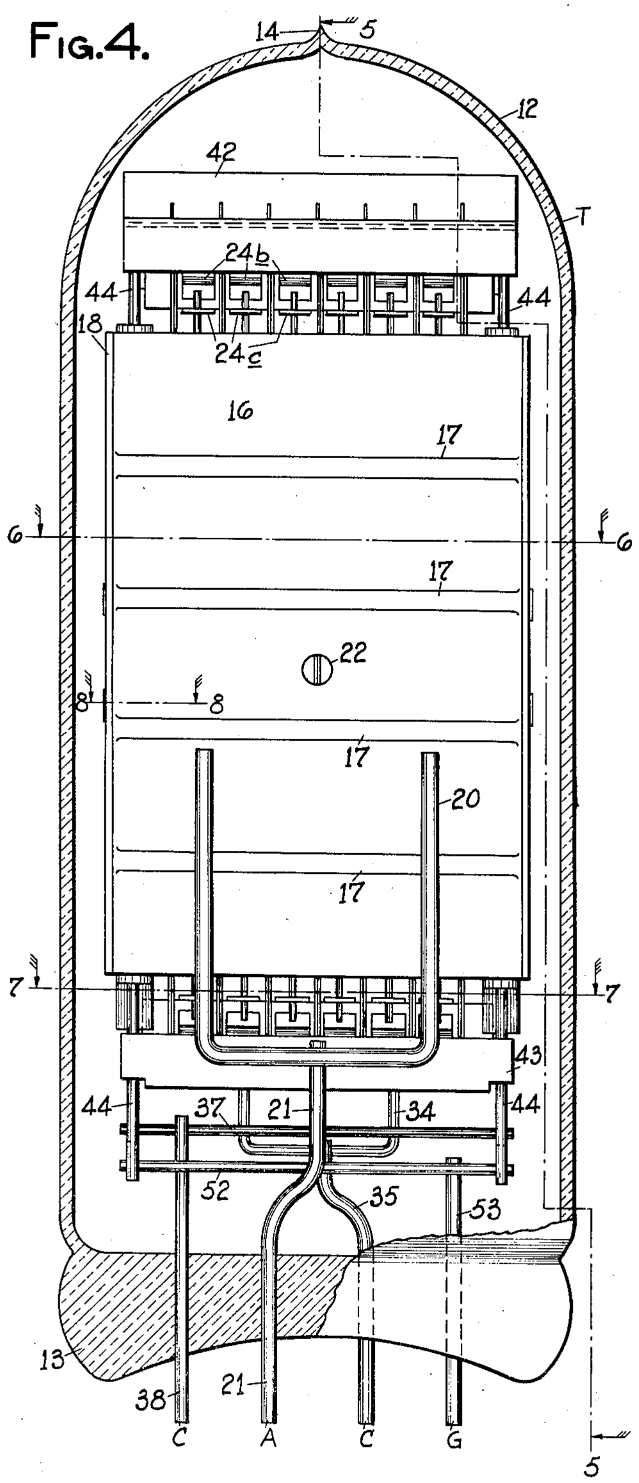
Fig. 4 is a longitudinal section through the evacuated envelope of one form of the tube of this invention, showing in elevation one side of the electrode assemblage.
Figure 6:
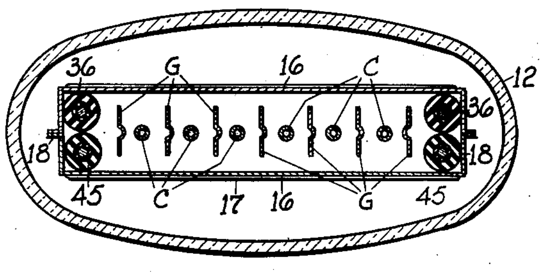
Figure 7:
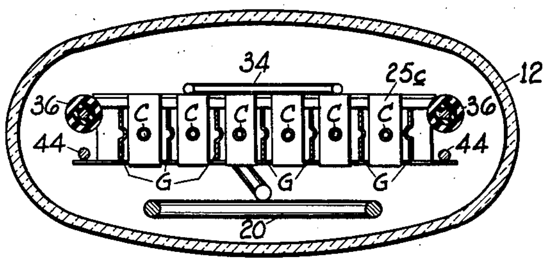

Figs. 6 and 7 are transverse sections through the envelope and electrode assemblage taken on the lines 6—6 and 7—7 respectively in Fig. 4.

Figure 8:
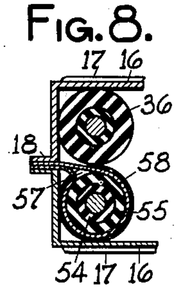

Fig. 8 is an enlarged fragmentary section through a portion of the anode as indicated by the line 8—8 in Fig. 4 to illustrate the mode of fastening the tubular insulators to the anode.

Figures 9, 10:
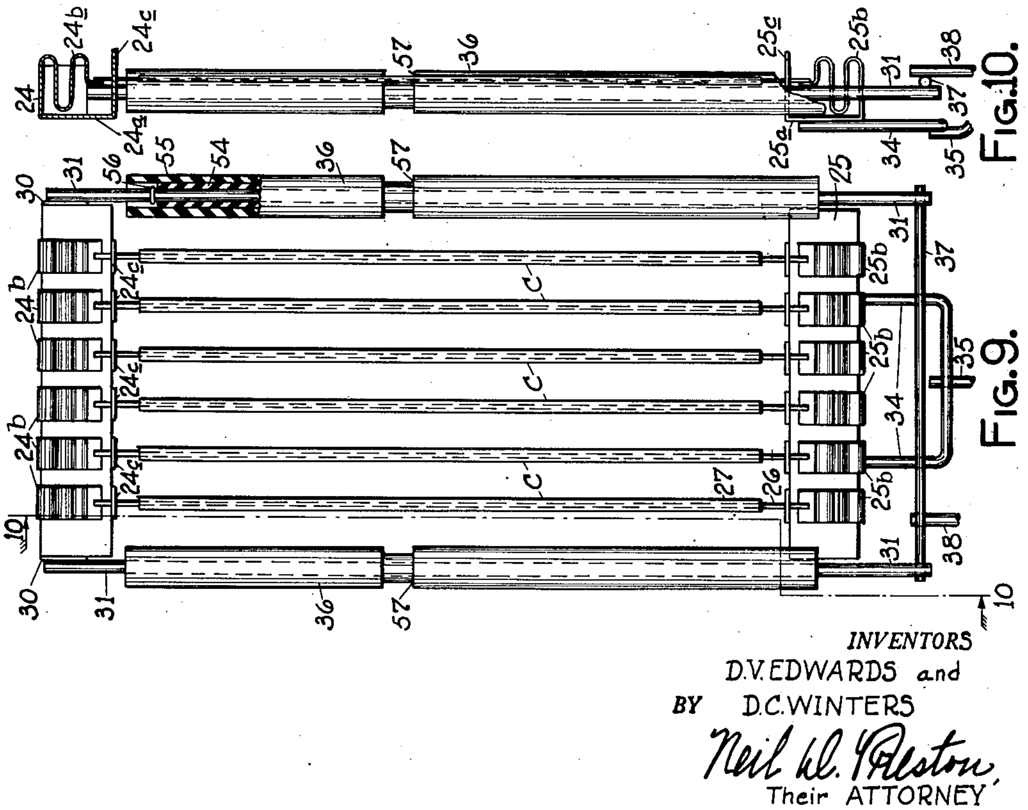

Fig. 9 is a side elevation of the cathode assembly forming part of the electrode assemblage.

Fig. 10 is a longitudinal section through the cathode assembly taken on the line 10—10 in Fig. 9.

Figure 11:
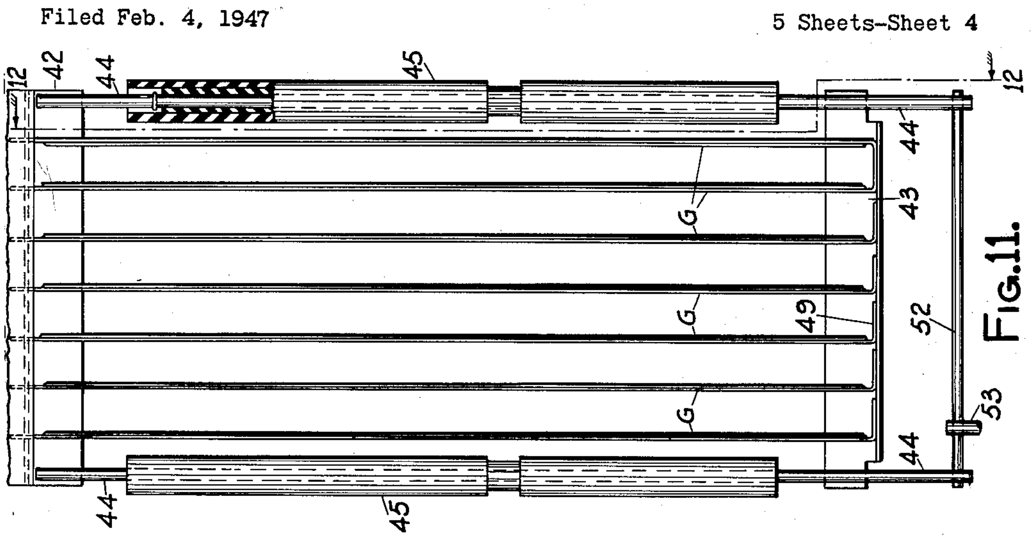

Fig. 11 is a side elevation of the grid bar assembly.

Figure 12:
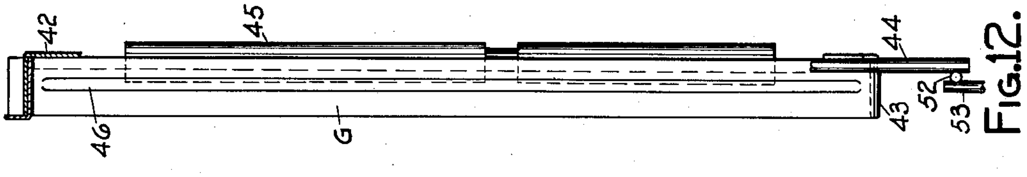

Fig. 12 is a longitudinal section through the grid bar assembly taken on the line 12—12 in Fig. 11.

Figure 13:
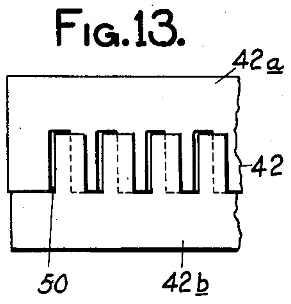
Figure 13A:
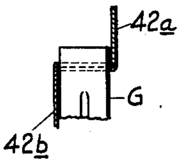

Figs. 13 and 13A are fragmentary views illustrating details of a structure for supporting the upper ends of the grid bars shown in Figs. 11 and 12.

Figs. 14A to 14D are fragmentary views showing in cross section certain modified forms of the cathode.

Fig. 15 is an enlarged longitudinal section through a modified form of indirectly heated cathode.

Fig. 16 is a fragmentary view of one end of the indirectly heated cathode of Fig. 15 to show the connections for the heater wire.

Figures 1, 2:
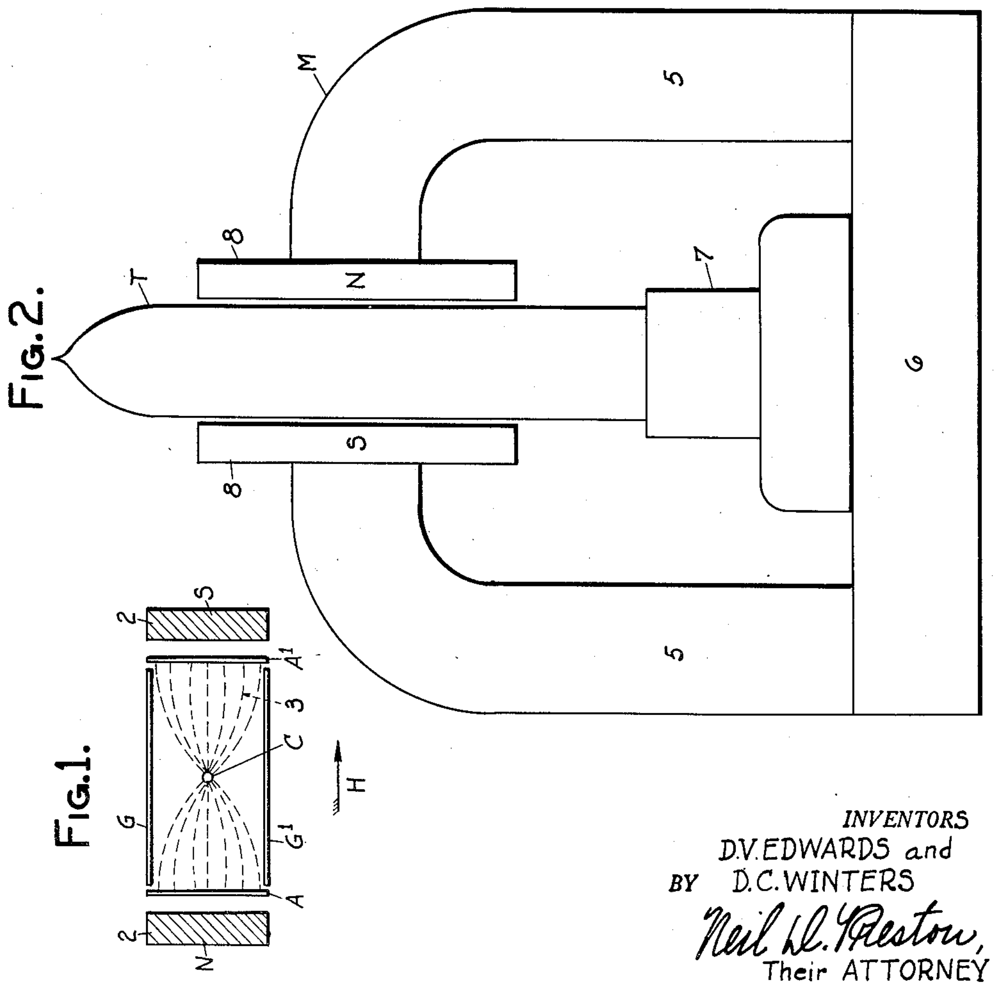
Fig. 1 is a fragmentary and diagrammatic view in section of an elemental unit showing the basic arrangement of electrodes and magnetic field for the tube of this invention.

Before discussing in detail the structural features of the embodiments of the invention illustrated, it is expedient to consider the organization and function of what may be termed the elemental tube unit of a magnatriode as diagrammatically shown in Fig. 1. This elemental unit of the magnatriode, which is expanded into the structures of this invention, comprises a thermionic emissive cathode C of a suitable type in an elongated or filamentary form. The anode comprises two flat plates A, $A^1$ located in parallel relation on opposite sides of the cathode. Two grid bars G, $G^1$ are located on opposite sides of the cathode C in planes substantially at right angles to the planes of the anodes A, $A^1$. These elements of the tube are disposed in a strong uni-directional and steady magnetic field between the pole pieces 2 of a permanent magnet or equivalent source of magneto-motive force, which provides magnetic lines of force, indicated by the arrow H, acting substantially at right angles to the anodes A, $A^1$, and substantially parallel with the surfaces of the grid bars G, $G^1$. Fig. 1 may be said to represent a transverse section through the tube; and the cathode C, anodes A, $A^1$ and grid bars G, $G^1$ may be extended for such length as is suitable for disposition in the magnetic field.

In this elemental tube unit, it is contemplated that the cathode C will be capable of emitting a surplus of electrons at the maximum anode voltage, so that the anode current is space charge limited. The potential on the grid bars may be said to control or modify the potential gradient to the cathode provided by this space charge and the anode voltage, in such a way as to control the electron current to the anodes. Negative potentials on the grid bars tend to reduce and cut off the anode current, and positive potentials act to increase the anode current by neutralizing the effect of the space charge and also increasing the potential at the cathode surface to draw more electrons from the cathode. The effect of the magnetic field, indicated by the arrow H, may be said to converge or focus the electrons leaving the cathode C into two streams or beams, as indicated by dotted lines at 3, which are directed toward the anodes A, $A^1$ and pass between the grid bars G, $G^1$. Accordingly, no electrons reach the grid even when its potential is positive with respect to the cathode, assuming of course the magnetic field is of appropriate strength with relation to the spacing of the elements and voltages involved. In this way, the cross magnetizing action of the magnetic field with respect to the cathode and anodes serves to eliminate the grid current that occurs with positive grid potentials in the usual type of triode, thereby obviating the disadvantages of such grid current found in various applications of the conventional triode. This organization also permits substantial anode currents to be obtained for small anode voltages by the appropriate positive potential on the grid bars, thereby reducing the tube losses for a given anode current and improving the plate efficiency of the tube.

This type of magnatriode is disclosed in the prior application of James H. Burnett, Ser. No. 647,007, February 12, 1946; and no claim is made herein to these general structural features and characteristics of operation.

In the type of electron discharge device exemplified by this elemental form of magnatriode shown in Fig. 1, it is desirable for power tubes and the like, where large anode currents and adequate heat dissipation are needed, to increase the dimensions or area of the cathode, anodes and grid bars, and at the same time maintain a suitable space relationship and strength of magnetic field. It is proposed to obtain this objective in accordance with this invention by providing a suitable structural organization for supporting and electrically isolating the cathodes and grid bars of a plurality of elemental tube units of suitable length arranged side by side between closely spaced anode surfaces of substantial area. Such an arrangement, which may be termed a honeycomb or multi-cellular structure, affords a flat and relatively thin tube which may be advantageously disposed in a short airgap between the enlarged pole pieces of a permanent magnet, or equivalent source of magneto-motive-force. It can be readily appreciated that the shorter the airgap and the larger the area of the pole pieces of such a permanent magnet, the stronger will be the magnetic field through the tube; and strong magnetic fields are desirable because they permit higher positive potentials on the grid to be used to control the space charge and electron emission from the cathode without having electron current to the grid bars.

In providing such an assemblage of a number of elemental tube units in a multi-cellular structure, it is necessary to employ certain expedients in the support and mounting for the cathodes and grid bars, in order to obtain the relatively close spacing of the electrode surfaces that is desirable, and also maintain such spacing under the conditions of temperature changes and the like to which the tube elements and supports are subjected in the operation of the tube. Also, in this type of tube, the elongated filamentary cathodes are subjected to a sidewise bending or displacement force due to the reaction between the magnetic field in which the tube is disposed and the magnetic field created by the heating current flowing in the cathodes; and it is necessary to take this factor into consideration in providing a satisfactory tube structure. Further, in the proposed structural organization the grid bars assume an elevated temperature in the operation of the tube and tend to emit electrons by field emission for high anode voltages and negative grid potentials, thereby interfering with the control functions of the grid, so that special treatment of the grid bar surfaces is desirable in this organization to reduce the tendency of the grid bars to emit electrons under operating conditions.

Figure 3:
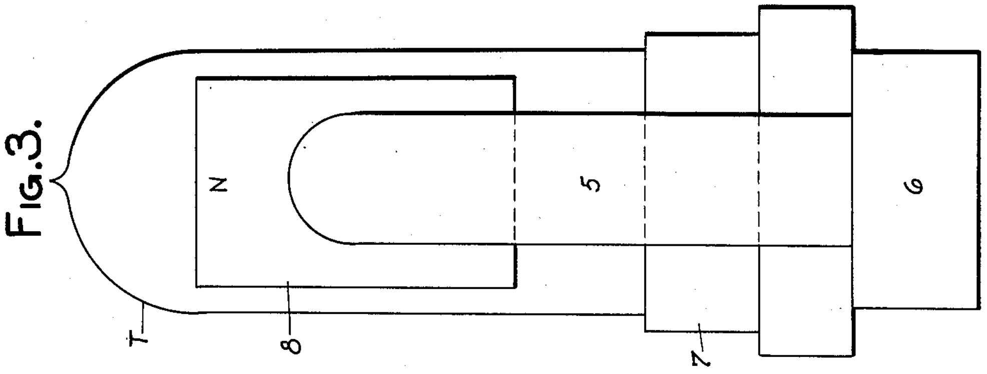
Figs. 2 and 3 are two general views showing in outline one arrangement of a tube structure of this invention with one type of magnetic field.

Considering now the specific embodiments of this invention shown, Figs. 1 and 2 are side views which illustrate in outline one arrangement of a permanent magnet M and its pole pieces with relation to the tube. In the particular arrangement illustrated, which is of course merely typical and subject to modification in practice, the permanent magnet M comprises two curved arms or legs 5, preferably circular in cross section, which are made of Alnico or like permanent magnet material, and are formed and magnetized in accordance with usual practice. The lower ends of these arms 5 have finished surfaces which are in intimate contact with a back-yoke 6 of soft iron, which is suitably fastened to said arms 5, such as by screws or bolts (not shown) threaded into inserts in the permanent magnetic stock. This back-yoke 6 may be used as shown for supporting a suitable socket 7, indicated merely in outline, for the tube T. Soft iron pole pieces 8 of a general rectangular shape and of appropriate dimensions are fastened to the upper ends of the arms 5 of the permanent magnet M in a suitable manner, such as by screws (not shown). It can be seen that this permanent magnet structure provides a strong magnetic field of substantially uniform density through the tube T throughout its width and for a greater part of its length; and since the tube elements are arranged and mounted, as later described, in a relatively thin envelope, the airgap between the pole pieces for the permanent magnet flux is short, and the magnetic field through the tube is of relatively high intensity. As illustrative of the type of structure contemplated, we have used pole pieces approximately three inches by four inches with an airgap of seven-eighths of an inch, with a permanent magnet providing a field intensity in the order of 5000 gauss. This is of course merely illustrative; and any suitable dimensions and proportions of parts may be employed in accordance with the invention. In describing this structural organization, it is convenient to assume that the tube is mounted in an upright position as shown in Figs. 2 and 3; but it should be understood that the tube may be used in any position desired.

Figure 5:
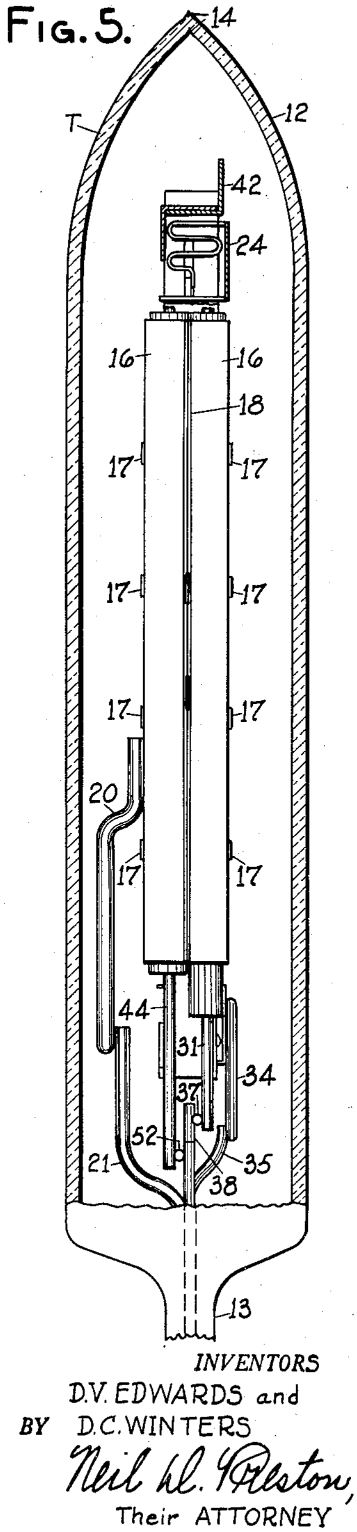
Fig. 5 is another longitudinal section of the tube taken along the line 5—5 in Fig. 4.

Referring to Figs. 4 and 5, the tube T comprises a flat and relatively thin envelope 12 of glass, which has its side walls straight longitudinally of the tube but curved transversely of the tube in the general form of an ellipse, as shown by the cross section of Fig. 6, to afford the necessary strength to resist pressure when the envelope is evacuated. A number of lead-in wires, which also constitute supports for the tube elements, are preferably sealed in a flat press 13 at the bottom of the tube envelope 12, in accordance with the usual practice and using an appropriate metal to provide a gas tight seal. The tube envelope 12 is exhausted through a tube at the top (not shown) which after the exhaust procedure is sealed off to leave the tip 14 illustrated.

The multi-cellular arrangement of cathodes, grid bars and anodes, characteristics of this invention, comprises in general an assembly of a plurality of parallel spaced cathodes, as shown in Figs. 9 and 10, an assembly of a plurality of parallel flat grid bars, as shown in Figs. 11 and 12, and two parallel anode plates fastened together along their vertical edges and surrounding these cathode and grid assemblies, together with metallic elements and insulating ceramic tubes, or the equivalent, for holding and insulating the parts in the proper space relation.

The single or unitary anode for the tube comprises two rectangular plates 16 of tantalum, molybdenum, or similar non-magnetic material, which are preferably formed with transverse ridges or corrugations 17, for stiffness. These anode plates 16 have their longitudinal edge portions bent over and formed with flanges 18 (see Fig. 6). After various parts of the tube are mounted and assembled, these flanges 18 of the anode plates 16 are spot welded to form in effect a stiff box-like anode approximately rectangular in cross section. This anode is supported in the tube envelope 12 by a U-shaped member 20, which has the ends of its legs welded to the one of the anode plates 16, and its lower portion welded to a lead-in support 21. A hole 22 in the anode plate, as shown in Fig. 4, exposes to view the parts within the anode for purposes of alignment.

The cathode assembly shown in Figs. 9 and 10 comprises in general upper and lower transverse supporting members 24, 25, conveniently termed headers. A plurality of cathodes C, six in the arrangement illustrated, are connected by suitable resilient means at equal spaced intervals to these headers 24, 25. In the arrangement shown, these cathodes C are in the form of tubes 26, with relatively thin walls and having an emissive coating indicated at 27. In one arrangement, these tubes 26 are of nickel constituting the core metal of the cathode, and are provided with an emissive coating prepared and treated in the manner disclosed in the prior patent to D. V. Edwards et al., No. 1,985,855, December 25, 1934. However, any suitable core metal and emissive coating may be employed.

This tubular form of elongated or filamentary cathode has the disposition of its metal in a cross section affording a high degree of strength as a beam against lateral bending. This need for lateral stiffness or rigidity is due to what is termed the motor action between the magnetic field, in which the tube is disposed, and the magnetic field created by the heating current through the cathode. Referring to the elemental tube unit of Fig. 1, for example, it can be seen that the cathode C disposed in a strong magnetic field acting in the direction indicated by the arrow H; and since this cathode C is in effect a wire carrying current, a force is exerted sidewise upon this cathode in one direction or the other, depending upon the direction of current flow with respect to the polarity of the magnetic field, tending to bend the cathode toward one of the grid bars G or $G_1$, in the same manner and for the same reasons that any wire carrying current in a magnetic field is subjected to a force. It can be appreciated that, unless the cathodes C shown in Fig. 9 have sufficient lateral stiffness, they will be bent or curved in one direction toward one grid bar and away from the other grid bar, in such a way as to disturb the desired spaced relation between the grid bars and the cathodes. While a circular cross section is well adapted for this purpose, various other cross sections affording a desired lateral stiffness, including a strip or other forms later described, may be employed without departing from the fundamental feature of the invention.

In the cathode supporting arrangement shown in Figs. 9 and 10, the upper header 24, for example, comprises a sheet of molybdenum, tantalum, or the like metal, which is cut away or notched, and then folded to have a vertically disposed body portion 24a, with tabs 30 at the ends to which are welded the rods or posts 31. Extending from the upper edge of this body portion 24a at equally spaced intervals are a plurality of strips or tongues 24b having a number of transverse bends, as indicated in the sectional view of Fig. 10, so as to form a number of separate resilient or spring-like anchorages for the cathodes C, the ends of the tubes 26 of these cathodes being welded to the ends of these strips 24b. Extending from the lower edge of the vertical body portion of the header are a plurality of projecting flanges 24c, formed with holes or slots, through which the tubes 26 of the cathodes pass, the dimensions of these holes or slots being such as to permit endwise movement of the cathodes, but hold the ends of the cathodes in the proper space relation.

The lower cathode header 25 is preferably constructed the same as the upper header 24, except that the tabs 30 for attaching the posts or rods 31 used for the upper header 24 are omitted. In other words, it is considered preferable to provide resilient supporting and guiding elements for expansion purposes for both ends of the cathodes C, although if desired this expedient may be used for only one end of the cathodes.

The lower header 25 is supported in a suitable manner in the tube envelope 12, independently of the upper header 24. In the particular construction illustrated, the body portion 25a of the lower header 25 is welded to the legs of a U-shaped supporting bracket 34 (see Figs. 4 and 5); and the lower end of this bracket is welded to the upper end of the lead-in support 35 sealed in the press 13 of the envelope 12. The two posts or rods 31, fastened to the ends of the other upper header 24, which are surrounded by tubular insulators 36 as later explained, are welded at their lower ends to a cross-bar 37, in turn welded to a lead-in support 38 sealed in the press of the envelope. During the final stages of mounting the electrode assembly on the stem of the envelope, the lower header 25 is pulled down to stretch apart the folds of the strips 24*b* and 25*b* constituting the resilient cathodes connecting elements, before welding the supporting cross-bar 37, so that as the cathodes C expand in operation of the tube, the folds of these strips 24*b* and 25*b* may move together and maintain sufficient tension on the cathodes independently to keep them straight in spite of the increase in their length.

It can be seen that in this construction each cathode C may expand individually and independently of the other cathodes, thereby taking care of unavoidable manufacturing variations in these different cathodes. During such expansion, the ends of each cathode are guided by the openings in the associated extensions 24*c*, and are thus mantained in the proper space relation, in spite of any sidewise twisting or displacement of the folded strips 24*b* as they contract.

The lead-in and supporting rod 38 and the posts 31 connected to the upper header 24 provide an electrical connection to this header, and the lead-in and supporting rod 35 and U-shaped bracket 34 provide an electrical connection to the lower header 25, so that heating current may be supplied to the cathodes in multiple between these headers.

The grid assembly shown in Figs. 11 and 12 comprises upper and lower headers 42 and 43, which are supported and held apart by rods or posts 44 welded to tabs on the ends of these headers. Each of these posts is provided with a ceramic insulating tube 45, as later explained. The grid bars G, which are preferably formed with a longitudinal stiffening rib or corrugation, as indicated at 46, are supported from the headers 42, 43 in such a way that they may expand or contract without bending.

In the arrangement shown, the lower ends of the grid bar G are bent transversely to form lips as indicated at 49 in Fig. 11 which are welded to the horizontal portion of the lower header 43. The upper ends of the grid bars have a sliding fit in narrow transverse slots in the upper header 42. Figs. 13 and 13A are fragmentary views showing how the upper header 42 is conveniently made to provide such slots 50 to receive the ends of the grid bars G. Two flat strips 42*a* and 42*b* are formed with a plurality of rectangular projections of such width and spacing that these strips may be overlapped and welded together to form the relatively long and narrow slots 50 for the ends of the grid bars G. The edge portions of these strips 42*a* and 42*b* are then bent up and down respectively to form a member of Z-section for stiffness, as shown in Fig. 13A.

Referring to Figs 4 and 9, it can be seen that the headers 24, 25 for the cathode assembly have spaces or openings between the resilient anchorage means for the cathodes, into which the ends of the grid bars G of the assembly of Figs. 11 and 12 may fit, with the upper grid bar header 42 lying over the upper cathode header 24, and the lower grid bar header 43 lying below the lower cathode header 25, in the manner indicated in the cross section through the headers in their assembled position shown in Fig. 5.

The two supports or posts 44 of the grid assembly of Fig. 11 are connected at their lower ends by a cross bar 52 welded thereto, which is welded to the upper end of a lead-in wire 53, constituting a support and electrical connection to the entire grid bar assembly.

In the multi-cellular type of electrode assemblage characterizing this invention, it can be appreciated that, if the cathode and grid assemblies, as well as the anode, were held in position only at their lower ends by the supports sealed in the envelope, the proper space relation of these electrodes would not be accurately maintained throughout their length under the conditions of temperature changes and the like to which the tube would be subjected in operation. It would also be difficult to provide additional supports from the envelope for the upper ends of the different electrodes and obtain by ordinary mounting procedure the accuracy in position and space relation desirable. Accordingly, it is proposed in accordance with this invention to provide metallic and insulating elements for mechanically inter-connecting and at the same time insulating the grid bars and cathodes with respect to each other and to the anode, in such a way as to provide in effect a substantially rigid unitary assemblage of the different electrodes, which will have the proper space relation of the parts maintained independently of the means for supporting the electrodes within the envelope and establishing separate electrical connections thereto.

In the structural organization illustrated, each of the rods or posts 31, 44 fastened to the upper headers 24, 44 of the cathode and grid bar assemblies is provided with a tubular insulator 36, 45 so disposed and fastened to the anode plates as to form a stiff and rigid structure. These tubular insulators are preferably of the type disclosed and claimed in the prior application of E. K. Smith, Ser. No. 674,953, June 7, 1946, which is now U. S. Patent No. 2,456,540, granted December 14, 1948. Briefly considering this structure, these tubular insulators are alike; and referring to the one for the cathode assembly shown partly in section in Fig. 9, an inner tube 54 of a ceramic material, such as commonly known as Steatite, is held against endwise movement on the post by suitably enlarging the cross section of the rod beyond the ends of this tube by a welding or deforming operation. An outer tube 55 of similar material fits closely around the inner tube, and is sufficiently longer than the inner tube to leave a recess at each end, as indicated at 56, for the purpose explained in the application of E. K. Smith above mentioned. A shallow flat groove, indicated at 57, is formed around the outer tube 55, and a flat metallic band 58 wrapped around the tube and seated in this recess 57, has its ends welded between the flanges of the anode plates 16, as best shown in the enlarged section of Fig. 8. These grooves are located at different lengths of the tubular insulators for the cathode and grid bar assemblies, as shown in Figs. 9 and 11. The outer tubes of these tubular insulators are preferably of the diameter to touch each other and the anode plates, as shown in the sectional view of Fig. 6, in order to increase the stiffness and rigidity of the entire electrode assemblage.

In the specific construction shown, the insulators are enclosed within the anode plates, and accordingly acquire high temperatures in the operation of the tube, which tends to lower the break-down resistance of the insulating material. Where high electrode voltages are involved and high break-down voltage for the insulators are desirable, it is preferable to use short insulating tubes such as 36 on the rods such as 31, and dispose these tubes beyond the ends of the anode plates, so that the insulating tubes have a lower temperature in the operation of the tube. These short tubes may be anchored by supplementary extensions of the anode plates in a manner that will be apparent, so as to afford the desired mechanical interconnection between the elements of the tube.

In connection with this space relation of electrodes it can be appreciated that the electron current to the anodes varies inversely with the distance between the cathode and anode surfaces, so that it is desirable to employ a close spacing between each cathode and the anode surfaces for the larger currents desired in connection with power oscillators, inverters and the like. A suitable cathode to an anode spacing, however, is dependent upon the dimensions, space relation, and desired control potentials on the grid bars, together with the anode voltages contemplated. For example, with a close spacing of cathode to anode and a high anode voltage, the electrostatic field intensity at the cathode may call for an area, location and potential for the grids for proper control of the anode current, which will not conform with the cathode to anode spacing chosen. In view of these inter-related factors, the particular electrode spacing for the tube of this invention will depend to a large degree upon the voltages, currents and other operating characteristics desired. Generally speaking, however, it is desirable to maintain a close spacing between the electrodes of this magnatriode type tube; and the structural expedients of this invention enable such close spacing to be provided and maintained under changes of temperature and other conditions of the operation.

In the proposed structural organization, the grid bars are relatively close to the cathodes and are also virtually surrounded by the anode, so that in operation of the tube, these grid bars may assume relatively high temperatures. Also, with the high anode voltages and negative grid potentials, which are advantageous for power tubes and the like, there is a strong electric field acting on the grid bars. These conditions tend to draw electrons from the grid bars by an action analogous to field emission, and thereby interfere with controlling effect of the grid.

In order to minimize such electron emission from the grids, and permit the use of higher anode voltages and grid potentials, it is proposed in accordance with this invention to use a material and a surface treatment thereof for the grids, which will reduce the grid emission. One arrangement for this purpose consists in using a grid of molybdenum, tantalum or similar non-magnetic material, and applying to this grid a coating of gold, platinum or similar metal having low emissivity at elevated temperatures, by a suitable process, such as electrolytically. Other forms or types of grid coatings and treatment may be employed, the requirements in this respect being dependent upon the voltage and current ratings of the tube.

The cathodes for the tube of this invention may take various forms. As previously noted, the filamentary cathodes characteristic of this magnatriode type of tube are subjected to sidewise bending force by the reaction of the magnetic field in which the tube is disposed and the magnetic field created by the heating current flowing in the cathode. Also, when the cathode is heated by alternating current, this sidewise force of what may be termed motor action varies with the frequency and tends to vibrate the cathode. For these reasons, it is desirable that the cathode should have a cross section suitable for withstanding such motor action forces without objectionable deflection, otherwise the spacing of the tube elements may be disturbed and affect the operating characteristics of the tube. Various forms of cathodes may be employed to satisfy these conditions. Instead of a nickel tube with an emissive coding as shown in Fig. 9 and previously explained, a strip of tungsten or thoriated tungsten, as indicated at 62 in Fig. 14A, may be used, and disposed edgewise in the direction of the force of the motor action, i. e. at right angles to the direction of the lines of force of the permanent magnet and the planes of the grid bars, and parallel with the anode surfaces. When such a strip 62 is made thin, it is necessary to maintain it under sufficient endwise tension to prevent its distortion and failure as a beam by warping or twisting. Such a strip form of cathode may be given additional lateral stiffness by having a curved cross section, as shown at 63 in Fig. 14B, or provided with longitudinal flanges as shown at 65 in Fig. 14D. Also, such a strip or sheet of tungsten or thoriated tungsten may be shaped to have a flattened elliptical cross section, as shown at 64 in Fig. 14C, or even be formed into a circular cross section. These and various other specific forms of cathodes are contemplated as coming within the scope of the invention as providing the desired lateral stiffness to stand the motor action characteristic of the magnatriode type of tube.

Also, tubes of this magnatriode type for certain voltages and ratings may employ to advantage an indirectly heated cathode, such as illustrated in Figs. 15 and 16. In the specific arrangement shown, the cathode comprises a tube 70 of nickel or similar material of a relatively small diameter corresponding with the tubes 26 indicated in Fig. 9, and suitable for the spacing of tube elements desired. The lower end of this tube 70 is partially ground or cut away and then flattened to provide an end portion indicated at 71 in Fig. 15, which is welded to a vertical tab 72 of a lower header 73, similar to the header 25 in the cathode assembly illustrated in Fig. 9. The upper end of the tube 70 has a sliding fit in a hole in the body portion of an upper header 74 of the cathode assembly. The outer surface of this tube 70 is coated with a suitable emissive coating, indicated at **70*a***, such as disclosed for example in the patent to D. V. Edwards et al., No. 1,985,855, December 25, 1934.

The heater for this indirectly heated cathode of Fig. 15 comprises a fine wire 76 of tungsten or a similar material, which is coated with a heat resistant insulating material, such as aluminum oxide. As shown, this heater wire 76 is welded at one end to the flattened end portion of the tube 70, extends up through this tube, is looped over outside the upper end of this tube, and then extends down inside the tube, where it is welded to a suitable auxiliary heater connector rod or bar, indicated at 77. Since the same heating current flows in opposite directions in the two portions of the heater wire 76 within the tube 70, the reaction of the magnetic field created by the heating current in this heater wire 76 with the permanent magnet field may tend to cause relative movement of the different portions of the heater wire, but does not exert any sidewise bending force on the cathode tube 70. In other words, this type of directly heated cathode has the advantage that the motor action tending to bend the cathode is eliminated.

The specific constructions and arrangements of parts illustrated are merely typical or representative of tube structures suitable for this purpose; and various adaptations, modifications and additions may be made to the specific embodiments of the invention illustrated without departing from the invention.

What we claim is:

1. An electron discharge device of the type described comprising, a permanent magnet having enlarged pole pieces with flat faces separated by a short airgap, an evacuated envelope in said airgap having flattened walls spaced a short distance from the faces of said pole pieces, an anode of general rectangular cross-section within said envelope and having closely spaced opposing planar surfaces in parallel relation to each other and to the faces of said pole pieces, a plurality of elongated thermionic emissive cathodes heated by current and disposed parallel in an equally spaced relation in a common plane midway between said anode surfaces, means including a pair of elements sealed in one end of said envelope for supporting said cathodes at both ends, and a flat grid bar on each side of each cathode extending parallel with said cathodes in a plane substantially at right angles to the planes of said anode surfaces.

2. A controllable electron discharge device comprising, a parmanent magnet having enlarged pole pieces separated by a short airgap, a flattened evacuated envelope of a general oblong shape disposed flatwise in said airgap, a multi-cellular assemblage of electrodes in said envelope mounted on supporting elements sealed in said envelope at one end thereof, said electrode assemblage including an anode having closely spaced opposing planar surfaces, a plurality of elongated flat grid bars and thermionic emissive current heated cathodes arranged alternately and extending lengthwise of said envelope between said anode surfaces, said grid bars being disposed in planes substantially at right angles to the planes of said anode surfaces and parallel with the magnetic lines of force between said pole pieces, and means including metallic elements and insulators for supporting and electrically insulating said grid bars and cathodes at both ends in a fixed space relation to each other and to said anode surfaces independently of said supporting elements for the electrode assembly.

3. An electron discharge tube of the type described for use in the airgap of a magnetic circuit comprising, an anode having closely spaced parallel planar anode surfaces, a plurality of equally spaced parallel grid bars disposed between said anode surfaces in planes substantially at right angles to the planes of said anode surfaces, and a plurality of elongated thermionic emissive cathodes one between each pair of adjacent grid bars and extending parallel with said grid bars and said anode surfaces, said grid bars each having a longitudinal stiffening rib to prevent bending of the grid bar flatwise toward an adjacent cathode, said cathodes having a length and a cross-section to limit sidewise flexure due to the reaction of the magnetic field of its heating current and the cross-magnetizing field for the tube, and means supporting said cathodes and grid bars at both ends.

4. An electron discharge tube of the character described adapted to be disposed in the short airgap between the enlarged pole pieces of a magnetic circuit comprising, an evacuated flat envelope of general elliptical cross-section and substantially parallel walls, a multi-cellular assemblage of electrodes mounted in said envelope and comprising a plurality of flat elongated grid bars extending in parallel relation at equally spaced intervals lengthwise of said envelope, a plurality of elongated thermionic emissive cathodes extending lengthwise of said envelope parallel with said grid bars, there being one cathode between each two adjacent grid bars, means anchored in one end of said envelope and supporting said cathodes and grid bars at both ends, said means including a lead-in connection for said grid bars and a pair of lead-in connections for supplying heating current to said cathodes, and an anode extending entirely around said cathodes and grid bars and having opposing surfaces substantially equi-distant from said cathodes and at right angles to said grid bars.

5. A controllable electron discharge tube of the character described for use in a magnetic field and comprising, an evacuated envelope having closely spaced side walls of substantial area, a multi-cellular assemblage of electrodes, means including supporting elements and lead-in connections sealed in said envelope for supporting said electrode assembly within the envelope, said electrode assembly including an anode having closely spaced parallel planar surfaces disposed flatwise to the side walls of said envelope, a plurality of grid bars and elongated cathodes arranged alternately between said anode surfaces and extending lengthwise of the envelope, and means including metallic elements and ceramic insulators for maintaining in a fixed space relation both ends of said grid bars and cathodes with respect to each other and said anode surfaces independently of the means for supporting the electrode assemblage in said envelope.

6. An electron discharge tube of the character described comprising, an evacuated envelope having closely spaced side walls of substantial area, a plurality of equally spaced parallel thermionic emissive cathodes extending longitudinally of said envelope, a plurality of flat grid bars one more than the number of cathodes disposed flatwise and in a parallel relation to said cathodes and equi-distant therefrom, and a common anode extending entirely around said cathodes and grid bars and having two closely spaced planar anode surfaces equi-distant from said cathode, said grid bars having their surfaces in planes substantially at right angles with the planes of said anode surfaces, and means sealed in one end of said envelope and including ceramic insulators for mechanically supporting and electrically insulating said grid bars and cathodes at both ends in a predetermined space relation with respect to each other and to said anode.

7. An electron discharge tube of the character described comprising, an anode of a general box-like form having closely spaced and substantially parallel anode surfaces, a multi-cellular structural arrangement of flat grid bars and elongated cathodes disposed between said anode surfaces, said grid bars and cathodes being arranged alternately at equally spaced intervals, means including separate headers for said grid bars and cathodes, together with metallic connections and ceramic insulators, for maintaining both ends of said grid bars and cathodes in a fixed space relation to each other and to said anode surfaces, and supporting elements sealed in one end of said envelope for supporting the electrode assembly in said envelope and affording independent electrical connections to said anode, grid bars and the ends of said cathodes.

8. An electron discharge tube of the type described, comprising a flat evacuated envelope of a general elliptical cross-section, an anode supported in said envelope having closely spaced opposing planar anode surfaces, a plurality of parallel grid bars equally spaced between said anode surfaces in planes substantially at right angles to the planes of said anode surfaces, a plurality of elongated thermionic emissive cathodes, one of said cathodes extending between each two adjacent grid bars lengthwise thereof and parallel with said anode surfaces, and means for supporting said grid bars and said cathodes at both ends from said envelope in a fixed space relation to each other and to said anode surfaces, said supporting means including a slidable connection for the ends of said grid bars and a flexible connection for the ends of said cathodes to permit their endwise expansion when heated.

9. In an electrode assemblage for electron discharge tubes of the type described comprising, a plurality of elongated thermionic emissive cathodes equally spaced in a parallel relation in a common plane, metallic headers adjacent the opposite ends of said cathodes, supporting means extending longitudinally of said cathodes and maintaining said headers in a predetermined space relation, each of said headers having bent resilient strips one for each cathode disposed at equally spaced intervals along said header, said strips being fastened to the ends of said cathodes and permitting expansion of said cathodes independently while maintaining their space relation.

10. An electron discharge tube of the character described comprising a multi-cellular assemblage of alternate elongated flat grid bars and filamentary thermionic emissive cathodes supported in an evacuated envelope, means constituting opposing anode surfaces around said grid bars and cathodes, said anode surfaces being in planes at substantially right angles to the planes of said grid bars, and means for supporting said grid bars and cathodes at both ends and including yieldable connections to permit elongation thereof without bending, said cathodes having a cross-section resisting bending movement in the direction of said grid bars.

11. An electron discharge tube of the type described for use in a cross-magnetizing magnetic field comprising, a flat evacuated envelope, two metallic headers separately supported in said envelope in a predetermined space relation, a plurality of substantially parallel elongated thermionic emissive cathodes extending between said headers at substantially equal intervals, one of said headers having a separate resilient supporting connection for each of said cathodes, said supporting connections acting to exert a tension on said cathodes independently as they expand when heated, and separate electrical connections to said headers extending through seals to the outside of said envelope to permit heating current to be supplied to said headers separately and flow through said cathodes in multiple.

12. A multi-tubular electrode assemblage for electron discharge tubes of the type described comprising, a plurality of elongated thermionic emissive cathodes, spaced headers having separate resilient supporting elements for the ends of said cathodes, said supporting elements permitting expansion of said cathodes independently while maintaining their substantially equally spaced parallel relation in a common plane, a plurality of flat elongated grid bars one more than the number of cathodes, headers maintained in a predetermined space relation by posts fastened to the ends thereof for supporting the ends of said grid bars to permit endwise expansion thereof, said headers at the corresponding ends of said cathodes and grid bars positioning each of said cathodes centrally between two adjacent grid bars, with said grid bars extending between said cathode supporting elements.

13. A multi-cellular assemblage of electrodes for an electron discharge tube of the type described comprising, a plurality of flat equally spaced parallel grid bars, a plurality of elongated thermionic emissive cathodes one between each two adjacent grid bars, means constituting opposing parallel planar anode surfaces around said grid bars and cathodes, said grid bars being disposed in planes substantially at right angles to the planes of said anode surfaces, means including separate upper and lower headers extending transversely of said grid bars and cathodes at their ends for supporting them in a predetermined space relation, said cathodes and grid bars being yieldably supported by their headers to permit independent endwise expansion, and means including ceramic insulators for maintaining said headers in a predetermined space relation to each other and said anode surfaces.

14. An electrode assemblage for an electron discharge tube of the character described comprising, a plurality of elongated cathodes and flat grid bars arranged alternately side by side with the grid bars disposed flatwise to the cathodes, means including separate pairs of headers connected to the ends of said cathodes and grid bars for supporting them in a fixed parallel spaced relation while permitting their endwise expansion, said grid bars each having a longitudinal stiffening rib to prevent sidewise bending toward an adjacent cathode, and each of said cathodes having a cross-section to withstand bending movement toward an adjacent grid bar.

15. A cathode assembly for an electron discharge tube of the character described for use in a cross-magnetizing magnetic field, said cathode assembly comprising two metallic headers having resilient cathode connecting elements spaced at equal intervals along said headers, a plurality of cathodes of circular cross-section with an exterior thermionic emissive coating, said cathodes having their ends fastened to said cathode connecting elements of said headers, and means for supporting and electrically isolating said headers in a predetermined space relation in an evacuated envelope, said resilient cathode connecting elements permitting endwise expansion of said cathodes individually and independently when heated.

16. In an electrode assemblage for electron discharge tubes of the type described, a plurality of equally spaced and elongated flat grid bars each having a longitudinal stiffening rib, headers maintained in a predetermined space relation by posts fastened to the ends thereof, and connections between the ends of said grid bars and said headers permitting edgewise expansion of said grid bars individually and independently.

17. An electron discharge tube of the type described for use in a strong magnetic field comprising, a plurality of parallel flat grid bars and elongated cathodes arranged alternately side by side, means including metallic headers extending transversely of said grid bars for supporting the ends of said cathodes, each cathode comprising a tube of a core metal with an emissive coating thereon, said tubes being attached at one end to one of said headers and having a slidable fit in a hole in the other header, each of said cathode tubes having therein a loop of insulated heater wire.

18. An electron discharge tube of the character described comprising, a plurality of grid bars and elongated cathodes disposed alternately in a cross-magnetizing magnetic field, each of said cathodes comprising a tube of core material with an emissive coating and having therein a loop of insulated heater wire, and means for supporting said cathode tubes at their ends and permitting endwise expansion of said tubes when heated.

19. An electron discharge tube of the character described comprising, a plurality of flat grid bars and cathodes arranged alternately in parallel relation in a cross-magnetizing magnetic field, means including a pair of supports extending longitudinally of said grid bars and a transverse member with spaced holes therein and supporting the ends of said cathodes with a slideable connection permitting endwise expansion, said cathodes being formed or thoriated tungsten having a length and cross section to withstand a sidewise bending due to the reaction of the magnetic field of the heating current in said cathode and the cross-magnetizing magnetic field for the tube.

20. A controllable electron discharge device comprising in combination, a source of magnetomotive-force providing a magnetic field through a short airgap, an evacuated envelope in said airgap inclosing a multi-cellular assembly of electrodes, said electrodes comprising a plurality of elongated grid bars equally spaced and disposed edgewise to said magnetic field, an anode having opposing planar surfaces substantially at right angles to said grid bars and said magnetic field, a plurality of filamentary thermionic emissive cathodes heated by current and extending lengthwise between said grid bars and anode surfaces with one cathode between each pair of adjacent grid bars, and means sealed in one end of said envelope and including conductive and insulating elements for supporting said cathodes and grid bars at both ends in a predetermined relation to each other and said anode surfaces, said means affording independent electrical connections to said grid bars and to the ends of said cathodes for grid and heating circuits.

21. A controllable electron discharge tube of the type described for use in the short airgap of a magnetic field comprising in combination, an anode having opposing planar surfaces in planes at right angles to the magnetic field, a plurality of elongated cathodes and a plurality of grid bars disposed alternately at substantially equal intervals between said anode surfaces, means supporting said cathodes at both ends in a spaced parallel relation by yieldable connections to permit endwise expansion thereof, said means including separate electrical connections to the opposite ends of said cathodes for supplying heating current thereto, each of said cathodes having a cross section for withstanding sidewise bending in a direction toward an adjacent grid bar under the influence of the force created by the reaction of the magnetic field in which the tube operates and the magnetic field created by the flow of heating current in said cathode.

22. A controllable electron discharge tube of the type described comprising, in combination with a plurality of linear current heated cathodes and two opposing planar anode surfaces, a control electrode assembly including a plurality of elongated flat grid bars electrically connected and stiffened against sidewise bending, said grid bars being one more in number than the number of cathodes and being disposed in parallel relation to provide a grid surface on opposite sides of each cathode, and means supporting said grid bars at their ends to permit free endwise expansion of said grid bars independently when heated.

23. A controllable electron discharge tube of the character described for use in the short airgap of a magnetic field comprising in combination, a flattened evacuated envelope in said airgap, a multi-cellular assemblage of electrodes within said envelope including an anode having closely spaced opposing planar surfaces, a plurality of filamentary thermionic emissive cathodes, a plurality of grid bars capable of controlling space current from said cathodes to said anode surfaces, said grid bars and cathodes being disposed alternately and at equally spaced intervals between said anode surfaces and extending in parallel relation to each other and said anode surfaces, means anchored to said envelope and supporting said cathodes and said grid bars at both ends to maintain their space relationship, said supporting means including yieldable connections permitting endwise expansion of said grid bars and cathodes individually when heated, said means including separate electrical connections sealed in said envelope for supplying heating current to said cathodes, said cathodes having a cross section to withstand sidewise bending towards an adjacent grid bar due to the reaction of the magnetic field of the heating current in said cathode and the magnetic field in which the tube operates.

DONALD V. EDWARDS.
DONALD C. WINTERS.

REFERENCES CITED

The following references are of record in the file of this patent:

UNITED STATES PATENTS

| Number | Name | Date |
|---|---|---|
| 1,657,574 | Hazeltine | Jan. 31, 1928 |
| 2,122,377 | McCarthy | June 28, 1938 |
| 2,144,249 | Allen | Jan. 17, 1939 |
| 2,160,044 | Warren | May 30, 1939 |
| 2,248,712 | Litton | July 8, 1941 |
| 2,356,112 | West | Aug. 15, 1944 |